UNITED STATES PATENT OFFICE.

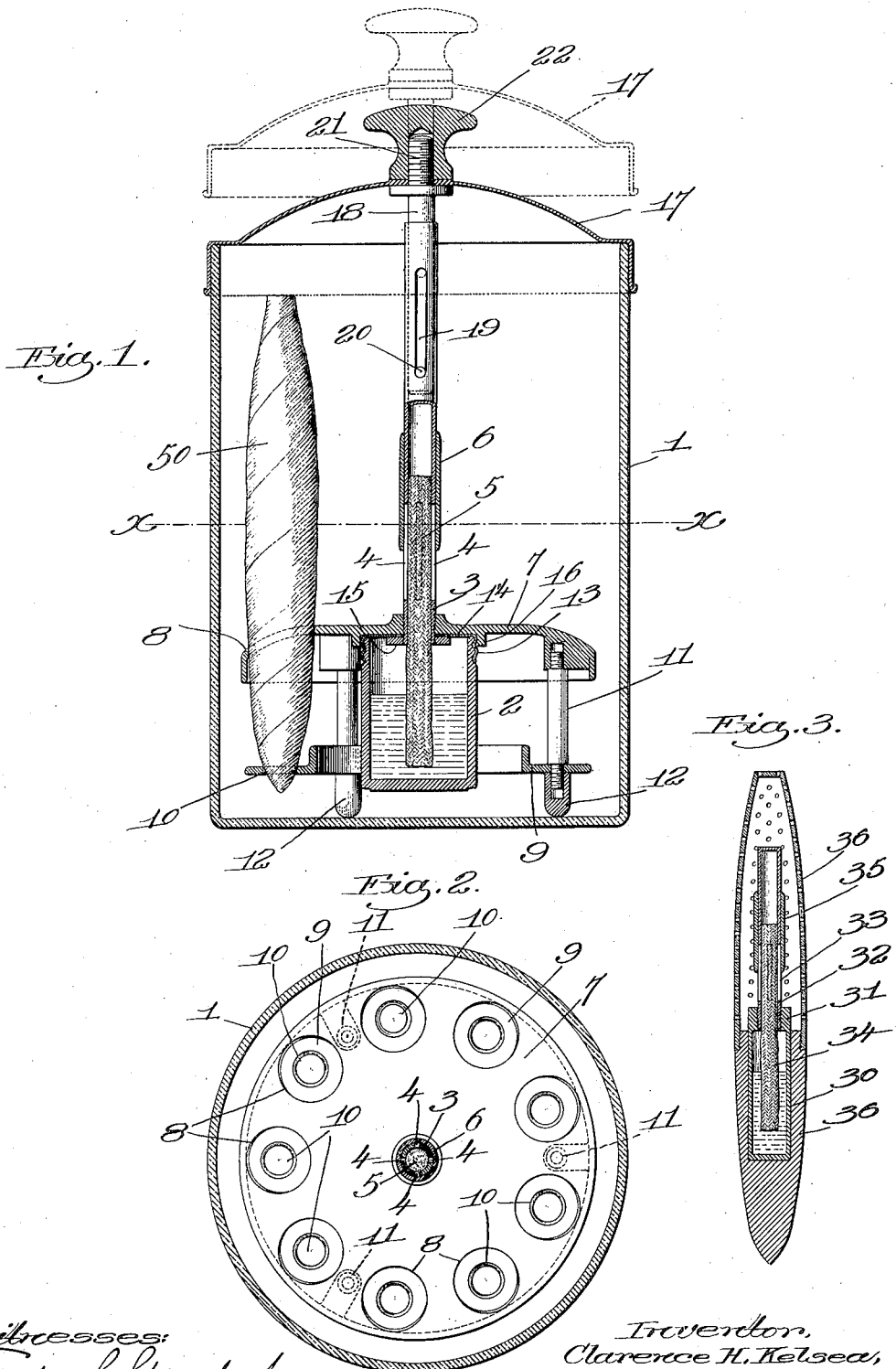

CLARENCE H. KELSEA, OF LYNN, MASSACHUSETTS.

HUMIDOR.

1,074,871.　　　　　Specification of Letters Patent.　　Patented Oct. 7, 1913.

Application filed March 11, 1912. Serial No. 683,036.

*To all whom it may concern:*

Be it known that I, CLARENCE H. KELSEA, a citizen of the United States, residing at Lynn, county of Essex, State of Massachusetts, have invented an Improvement in Humidors, of which the following description, in connection with the accompanying drawing, is a specification, like characters on the drawing representing like parts.

This invention relates to humidors and has for its principal object to provide a humidor which is specially adapted for keeping the air moist in a small compartment, such, for instance, as that in which cigars or tobacco may be kept. I would state, however, that my invention is not limited in its use to keeping cigars or tobacco moist, but is capable of general use wherever it is desired to keep the atmosphere in a small compartment in a moist state.

Other objects of my invention are to provide a novel device of this sort embodying a receptacle for containing water, a wick tube having a wick therein which leads into the water in the receptacle, and means for controlling the extent of the evaporating surface of the wick, thereby controlling the rapidity of evaporation.

Other objects of the invention are to simplify and improve humidors, all as will be more fully hereinafter described and pointed out in the appended claims.

In order to illustrate the principle of the invention I have shown it in the drawings as it might be embodied in a humidor for keeping cigars moist, but as stated above, the invention is capable of a wide range of use, and by properly modifying the shape of the container or interior holder it may be used for a large variety of purposes.

In the drawings: Figure 1 is a vertical sectional view through a device illustrating one embodiment of the invention; Fig. 2 is a section on the line x—x, Fig. 1; Fig. 3 is a vertical section through a device showing a different embodiment of my invention.

Referring now to Fig. 1, 1 designates a jar or container which is preferably made of glass, although the particular material of which it is made does not form any part of the invention. This jar or container is shown as open at the top. On the interior of the jar is an evaporating device which has associated therewith means for holding cigars. The evaporating device comprises a receptacle 2 adapted to contain water or other liquid, a wick tube 3 communicating with the receptacle and provided with one or more evaporating apertures 4, a wick 5 which is contained within the wick tube 3 and the lower end of which leads into the receptacle 2, and a controlling member 6 in the form of a sleeve movably mounted on the wick tube and by which the area of the openings 4 may be varied, thereby varying the amount of wick surface which is exposed. In the embodiment shown in Fig. 1 the receptacle 2 and wick tube 3 have associated therewith a cigar holder. This cigar holder is shown as comprising a positioning member 7 in the form of a disk or plate which is secured to the wick tube 3 and is provided with apertures 8 for the reception of cigars 50, and a supporting member 9 situated beneath the positioning member and adapted to support the cigar, said supporting member being preferably provided with small apertures 10 in which the ends of the cigars may be received. The supporting member may be sustained in any suitable way. As herein shown I have provided tie bolts 11, the upper ends of which are screw-threaded into the under side of the positioning member 7 and the lower ends of which extend through the supporting member 9 and have nuts 12 screwed thereto. Said nuts are in the form of cap nuts and constitute legs on which the cigar supporting device is sustained.

The wick tube 3 is shown as screw-threaded to the positioning member 7. The receptacle 2 is adjustably connected to the wick tube so that it can be readily removed when it is necessary to fill it. For this purpose I have shown the receptacle as provided with screw threads at its top which screw threads engage the screw-threaded flange 13 of a cover 14. The wick tube 3 extends through the cover 14 and has a nut 15 screw-threaded to its lower end, said nut operating to clamp the cover 14 to the positioning member 7. The said positioning member is shown as provided with an annular flange 16 which forms a sort of recess in which the cover 14 is received.

17 designates a cover for the jar or receptacle 1. I have herein provided a connection between the cover 17 and the cigar supporting device so that when the cover 17 is lifted from the jar the cigar supporting device can be lifted from the jar, thus making the cigars accessible. As herein shown the cover 17 has secured thereto a depending stem 18 which has telescopic engagement with the upper end of the wick tube 3, means being provided for limiting the telescopic movement of the stem and wick tube. The wick tube is shown as having a slot 19 in which is received a pin 20 extending from the stem 18. While any connection between the stem and the cover 17 may be employed, I have herein shown the upper end of the stem as provided with a screw-threaded nipple 21, which extends through the cover and to which a knob or handle 22 is screwed.

In using the device the receptacle 2 will be filled with water and the controller 6 will be adjusted on the wick tube so as to expose any desired proportion of the area of the slot 4. The cigars are then placed in the cigar holding portion of the device and the cigars and evaporating mechanism are placed in the jar 1. The controller 6 may be adjusted so that any desired degree of humidity can be maintained in the jar 1. Whenever a person desires to use a cigar he will remove the cover 17 from the jar by grasping the handle 22, and during the initial upward movement of the cover the pin 20 will slide upwardly in the slot 19. When the pin reaches the upper end of the slot then further upward movement of the cover will lift the cigar holder out from the jar 1. The cigars can be readily removed from the holder after the latter has been taken out from the jar 1, and because of the telescopic connection between the cover 17 and the wick tube the distance between the upper end of the cigars and said cover will be sufficient so that the cigars can be readily removed from the supporting member and positioning member 7 without striking the cover.

When the cigar holder and evaporating apparatus are in the jar 1 and the parts are in the position shown in full lines Fig. 1, the cover 17 stands comparatively close to the upper end of the cigars, and this makes a compact device which is only slightly taller than the length of the cigar.

It will be noted that the positioning member 7 is curved slightly. The purpose of this construction is to facilitate the removal of individual cigars from the cigar holder, for when the said holder has been removed from the jar 1 any individual cigar may be first lifted vertically to free the lower end thereof from the supporting member 9 and then the upper end of the cigar may be swung outwardly beyond the cover 17, when it can be readily removed from its aperture 8.

The device herein shown for controlling the amount of evaporation from the wick can be embodied in humidors of various constructions, and in Fig. 3 I have shown a humidor embodying my invention and having a general form and shape of a cigar. Such a device can be placed in a cigar case with other cigars and will serve to keep the cigars moist. In this latter embodiment of the invention the water-containing receptacle is shown at 30 and it has a cap 31 removably applied thereto, to which is secured the wick tube 32 provided with the slot 33. 34 is the wick which is confined within the wick tube and extends into the receptacle 30, and 35 is the controller by which the amount of evaporating surface is controlled. These parts are confined within a casing 36 having the general shape of a cigar, said casing being of reticulated material so that the moisture evaporating from the wick can pass therethrough. A device of this sort can be placed in a cigar case with other cigars and will serve to keep them moist.

It will be obvious that the evaporating apparatus herein described might be used in a variety of other ways than those illustrated in the drawing, and therefore I do not consider that my invention is limited to the constructural features herein shown.

Having fully described my invention, what I claim as new and desire to secure by Letters Patent is:—

1. In a humidor, the combination with a closed receptacle for containing water, of a wick tube extending therefrom, a wick in the wick tube and extending into the receptacle, said wick tube having a lateral opening through which a portion of the wick is exposed, and a controller fitting the wick tube and movably mounted thereon and by which the area of said opening may be varied.

2. The combination with a jar or casing having an open top, of an article-holding rack adapted to be received in the casing, a water-containing receptacle suspended from the rack, a wick tube leading from said receptacle and extending above the rack and provided with an opening, a wick in said tube, and a controller to vary the size of the opening.

3. In a humidor, the combination with a jar or casing having an open top, of a cover for said top, a water-containing receptacle, a wick tube communicating therewith and provided with an opening, a wick in said wick tube, a portion of which is exposed through the opening, an article-holding rack associated with the wick tube and adapted to be received within said jar, and means connecting said cover with said rack.

4. In a humidor, the combination with a jar or casing having an open top, of an article-holding rack to be received within the casing, a water-containing receptacle secured thereto, a wick tube leading to said receptacle and provided with an opening, a wick in said tube, and a controller for varying the size of said opening.

5. In a humidor, the combination with a jar or casing having an open top, of a cigar-holding rack to be received within the casing, a water-containing receptacle sustained by said rack, a wick tube extending from said receptacle, a wick within said tube, a cover for the receptacle, and a stem secured to said cover and having a limited telescopic engagement with the wick tube.

In testimony whereof, I have signed my name to this specification, in the presence of two subscribing witnesses.

CLARENCE H. KELSEA.

Witnesses:
BERTHA F. HEUSER,
THOMAS J. DRUMMOND.